(12) United States Patent
Hennig

(10) Patent No.: US 9,512,874 B2
(45) Date of Patent: Dec. 6, 2016

(54) BEARING DEVICE AND TURBOMACHINE HAVING A BEARING DEVICE

(71) Applicant: Rolls-Royce Deutschland Ltd & Co KG, Blankenfelde-Mahlow (DE)

(72) Inventor: Sebastian Hennig, Braunschweig (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 705 days.

(21) Appl. No.: 13/680,788

(22) Filed: Nov. 19, 2012

(65) Prior Publication Data

US 2013/0129504 A1 May 23, 2013

(30) Foreign Application Priority Data

Nov. 18, 2011 (DE) .................. 10 2011 086 675

(51) Int. Cl.
*F16C 33/66* (2006.01)
*F16C 19/54* (2006.01)
*F01D 25/16* (2006.01)
*F16C 41/02* (2006.01)
*F16C 33/60* (2006.01)

(52) U.S. Cl.
CPC .............. *F16C 19/54* (2013.01); *F01D 25/16* (2013.01); *F01D 25/164* (2013.01); *F16C 33/60* (2013.01); *F16C 41/02* (2013.01); *F05D 2230/64* (2013.01); *F16C 2360/23* (2013.01)

(58) Field of Classification Search
CPC ....... F16C 19/52; F16C 19/522; F16C 19/525; F16C 19/54; F16C 19/545; F16C 33/60; F16C 39/02; F16C 41/02; F16C 2360/23; F01D 25/16; F01D 25/162; F01D 25/164

USPC .............. 384/447, 476, 479, 493, 499, 517, 556,384/557, 905

See application file for complete search history.

(56) References Cited

U.S. PATENT DOCUMENTS

| | | | |
|---|---|---|---|
| 1,160,626 A * | 11/1915 | Lipe .............................. | 384/589 |
| 1,956,648 A | 5/1934 | William et al. | |
| 1,968,199 A | 7/1934 | Greve et al. | |
| 2,626,842 A | 1/1953 | Burks et al. | |
| 3,476,453 A * | 11/1969 | Kastner ......................... | 384/454 |
| 4,306,755 A | 12/1981 | Roberts | |
| 4,523,864 A | 6/1985 | Walter et al. | |
| 6,309,109 B1 * | 10/2001 | Chuang ......................... | 384/537 |

(Continued)

FOREIGN PATENT DOCUMENTS

| | | |
|---|---|---|
| DE | 215797 C | 3/1908 |
| DE | 890584 C | 9/1953 |

(Continued)

OTHER PUBLICATIONS

Carl Hanser Verlag, "Tiefziehen mit festen Wirkmedien ist auf Standardpressen moglich", BLECH Inform Mar. 2007, pp. 69-71, Munchen, with attached English translation.

(Continued)

*Primary Examiner* — James Pilkington
(74) *Attorney, Agent, or Firm* — Shuttleworth & Ingersoll, PLC; Timothy Klima

(57) ABSTRACT

A bearing device with an arrangement of at least two bearings is provided. A filling made of an amorphous/solid active medium as a mechanism of compensating for axial loads is arranged between a bearing race of at least one of the bearings and a surrounding component of the bearing arrangement.

21 Claims, 10 Drawing Sheets

(56) References Cited

U.S. PATENT DOCUMENTS

| | | | |
|---|---|---|---|
| 7,918,608 B2 | 4/2011 | Braun | |
| 8,100,646 B2 | 1/2012 | Venter | |
| 2008/0232731 A1 | 9/2008 | Venter | |
| 2010/0061674 A1* | 3/2010 | Koda et al. | 384/563 |
| 2010/0080700 A1* | 4/2010 | Venter | 415/229 |
| 2010/0142871 A1 | 6/2010 | Udall et al. | |
| 2010/0316322 A1* | 12/2010 | Derrer | F16C 19/38 384/571 |

FOREIGN PATENT DOCUMENTS

| | | |
|---|---|---|
| DE | 3013034 | 10/1980 |
| EP | 1972804 | 9/2008 |
| EP | 1978267 | 10/2008 |
| EP | 2119877 | 11/2009 |
| GB | 191419800 | 0/1915 |
| GB | 517418 | 1/1940 |
| GB | 601547 A | 5/1948 |
| JP | 2004034747 | 2/2004 |
| WO | 2008098543 | 8/2008 |

OTHER PUBLICATIONS

Carl Hanser Verlag, "Gehause mit Stahlkugeln fertigen", BLECH InForm 2009, Munchen with attached English Translation.
European Search Report dated Sep. 7, 2016 from counterpart European App No. 12192787.5.

\* cited by examiner

BEARING DEVICE AND TURBOMACHINE HAVING A BEARING DEVICE

CROSS-REFERENCE TO RELATED APPLICATION

This application claims the benefit of German Patent Application No. 102011086675.2 filed on Nov. 18, 2011, the entirety of which is fully incorporated herein by reference.

BACKGROUND

This invention relates to a bearing device and to a turbomachine having a bearing device.

The design of a turbomachine, in particular of an aircraft engine, is initially based on certain required performance characteristics. Only then are the loads applied on the bearing devices and other mechanical components determined. This can lead to an engine being optimized for a high performance for example, resulting in a very high thrust load that must be withstood by bearing devices.

SUMMARY

The object is therefore to provide bearing devices that can cope flexibly and efficiently with very high requirements when axially and radially loaded.

A solution is provided by a multi-row bearing device.

Here a filling made of an amorphous/solid active medium as a mechanism of compensating for axial loads is arranged between a bearing race of at least one of the bearings and an adjacent/surrounding component of the bearing arrangement.

The bearing race can here be an outer race or an inner race. If a filling made of an amorphous/solid active medium as a mechanism for compensating for axial loads is arranged between the bearing races and a surrounding component, the amorphous/solid active medium can absorb an axial force of the one bearing and transmit it to another bearing.

Exemplary embodiments of the filling can have balls for this purpose, in particular balls of identical size. Steel balls can for example be manufactured efficiently and are so sturdy that compensation of the axial forces is efficiently possible It can be advantageous here when the bearing race is designed as the outer race and the surrounding component of the bearing arrangement as the casing. Alternatively or additionally, the bearing race can be the inner race and the surrounding component a part of a shaft connected to the inner race. The filling is arranged and securely held between the bearing race and the surrounding component.

It is also possible that the bearing races, in particular the outer races, each have a defined piston surface using which an axial pressure force can be exerted on the filling. The defined piston surface of the first bearing race, in particular of the first outer race, and the piston surface of the second bearing race, in particular of the second outer race, can have different sizes. These measures, which can be used individually and in combination, ensure great flexibility for the transmission of forces.

In an additional exemplary embodiment, at least a part of the amorphous/solid active medium is packed into a film and/or cast into a flexible plastic compound. Hence the active medium can be inserted more easily into the bearing device. Also, the particles in the filling can be already aligned in advance in order to prevent any unfavorable "bridging" in operation.

Furthermore, in some exemplary embodiments, at least one pressure-transmitting element, in particular a spacer sleeve, a ring and/or a compression member can be arranged between the bearing races, in particular the outer races, and the filling. It is particularly advantageous here when two pressure-transmitting elements in the shape of concentric sleeves are arranged between the bearing races, in particular the outer races, and the filling. This makes particularly compact or complex designs possible, where for example the filling is displaced in the axial direction relative to the bearings.

There are exemplary embodiments in which at least one bearing is designed as an anti-friction bearing, as an axial air bearing or as a plain bearing.

It is also possible that rolling elements are designed spherical, barreled, tapered or cylindrical.

It is furthermore possible that at least two bearings are of different design, especially that one bearing is designed as radial bearing and another one as axial bearing.

In some exemplary embodiments it is here possible that one inner race of a bearing is of split design.

A solution is provided by a turbomachine.

In one exemplary embodiment of the turbomachine, one bearing device in a three-shaft aircraft engine is arranged between a low-pressure shaft and an intermediate-pressure shaft or between an intermediate-pressure shaft and a high-pressure shaft, or in the case of a two-shaft aircraft engine between a low-pressure shaft and a high-pressure shaft.

BRIEF DESCRIPTION OF THE DRAWINGS

The invention is described in light of the figures showing exemplary embodiments.

DETAILED DESCRIPTION

Figure 1:
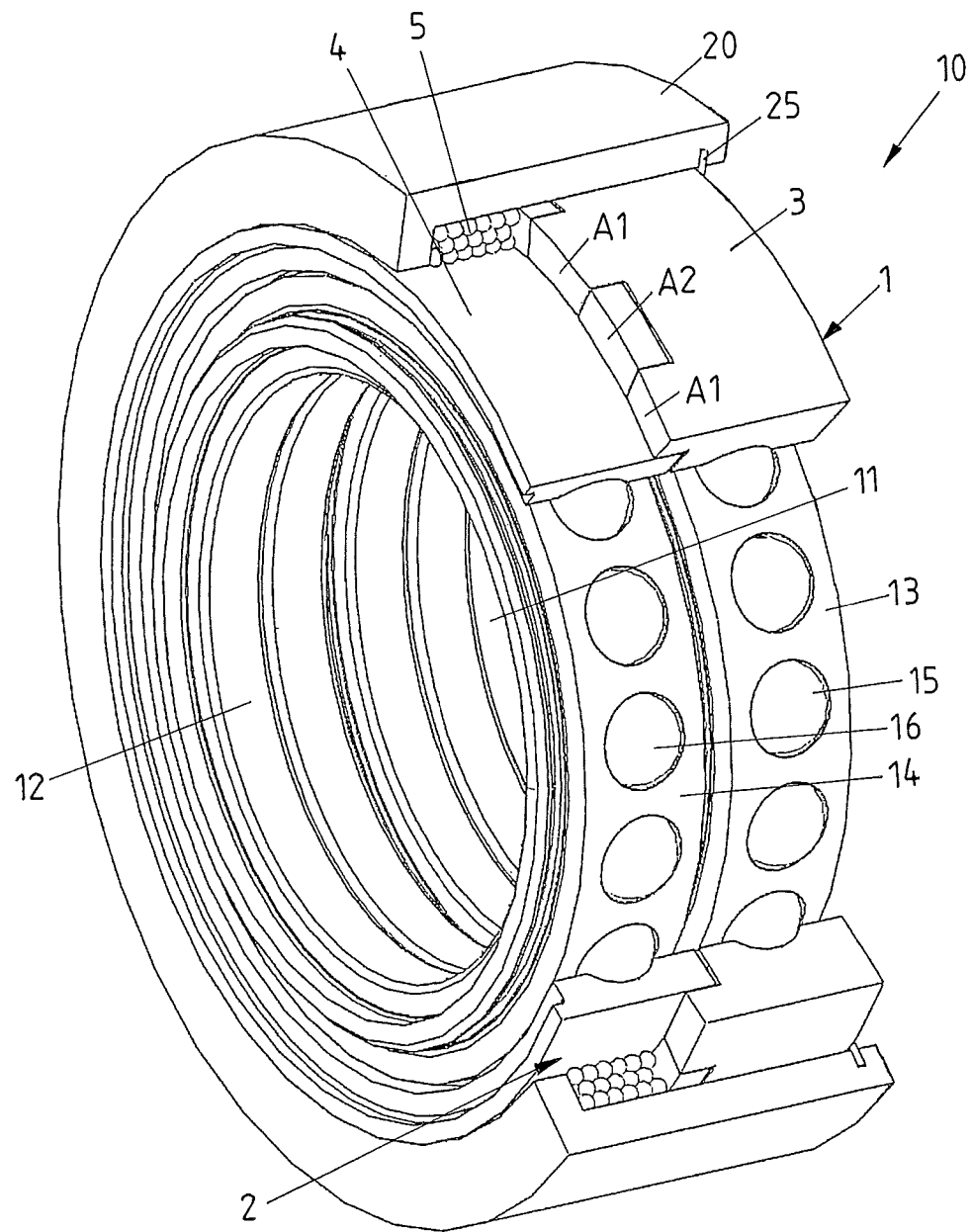
FIG. 1 shows the basic structure of an embodiment of a bearing device.
Figure 7:
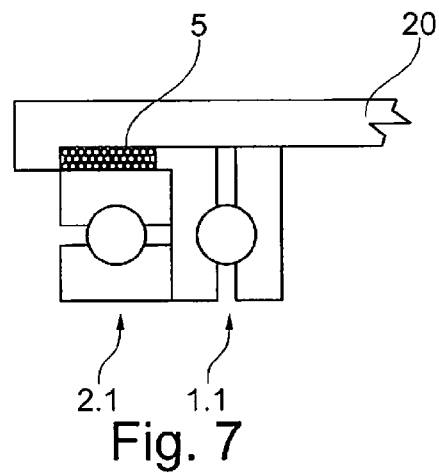
FIG. 7 shows a partial schematic sectional view of a two-row radial bearing having a pure axial bearing and a radial bearing.
Figure 9:
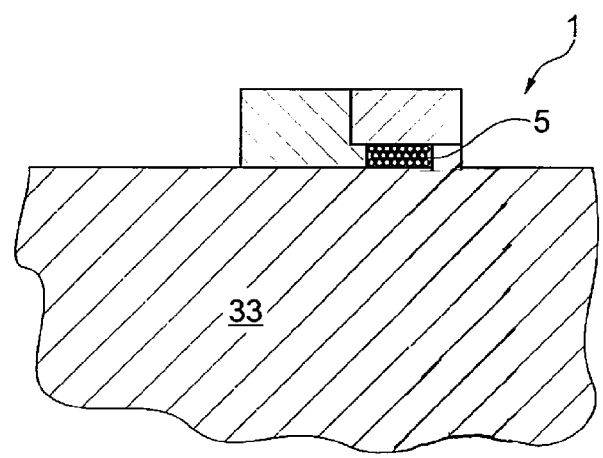
FIG. 9 shows a schematic sectional view of an embodiment including a plain bearing.

FIG. 1 shows a perspective partial sectional view of a multi-row bearing device 10. The embodiment here shown is designed as a two-row radial bearing device 10, i.e. the bearing device 10 has a first bearing 1 and a second bearing 2. The bearings 1, 2 are here designed as anti-friction bearings, in particular as ball bearings. It is however quite possible to use other anti-friction bearings or plain bearings (see FIG. 9). Generally speaking, it is also possible for the anti-friction bearings 1, 2 to be of different design, i.e. a pure axial bearing 1.1 is combined with a radial bearing 2.1 for transmitting radial and axial forces. See FIG. 7 showing a partial schematic view of such an arrangement.

The respective inner races 11, 12 of the anti-friction bearings 1, 2 are split in a manner known per se. The use of split inner races is not essential, but they are frequently used in aircraft engines in particular. In this way, more rolling elements 15, 16 can be installed than in bearings with unsplit races. The split inner race 11, 12 is arranged on the inner diameter, since higher forces are effective between the balls and an outer race 3 due to centrifugal forces. An unsplit outer race 3, 4 enables a better contact behavior between ball and raceway to be achieved for keeping the surface pressures within limits. Rapidly rotating main bearings in engines therefore usually have a split inner race 11, 12 and a single-part outer race 3, 4 (so-called "three-point bearing"). Generally speaking, a single-part inner bearing shell can also be used.

Figure 10:
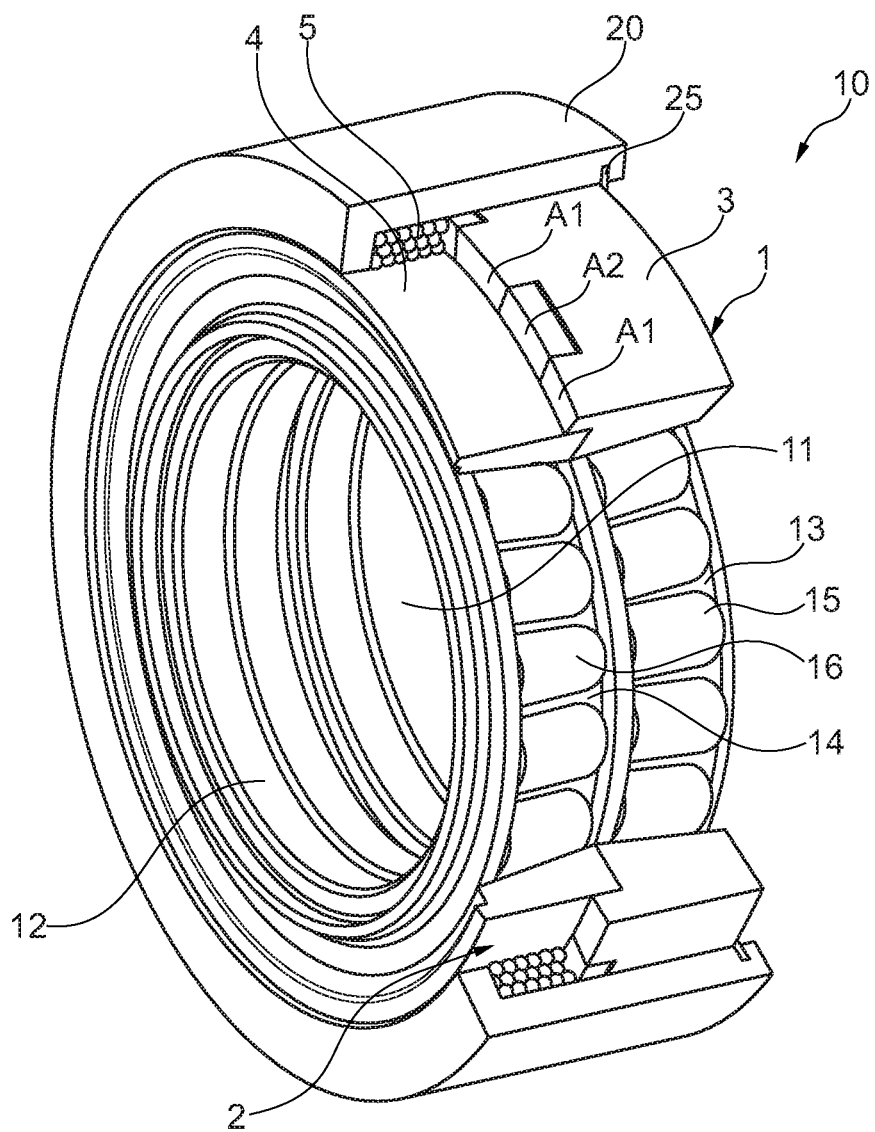
FIG. 10 shows a partial schematic view of an embodiment having tapered rollers.
Figure 11:
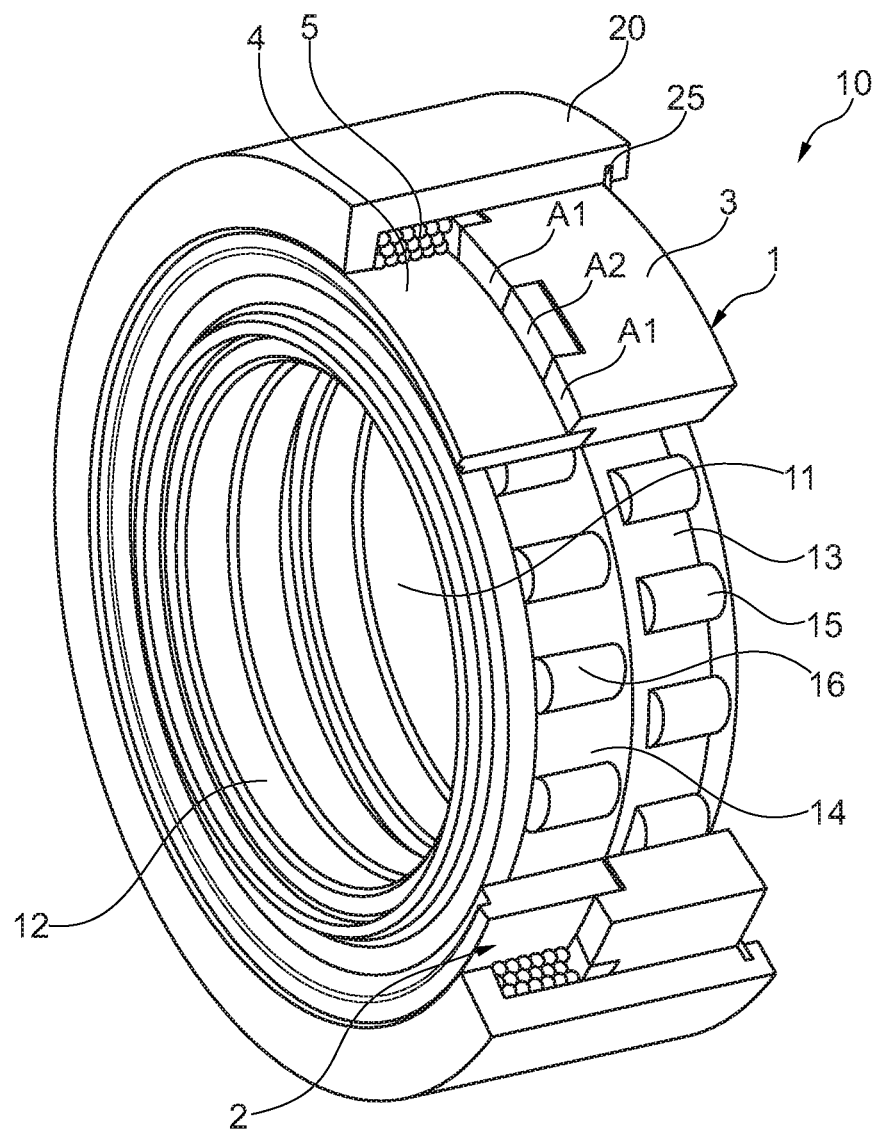
FIG. 11 shows a partial schematic view of an embodiment having cylindrical rollers.
Figure 12:
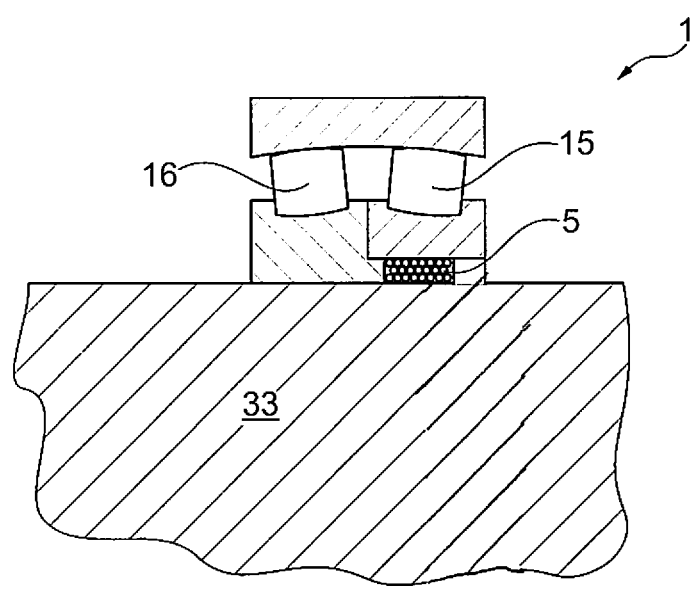
FIG. 12 shows a partial schematic view of an embodiment having barrel rollers.

Cages 13, 14 for the rolling elements 15, 16 are arranged around the inner races 11, 12 respectively. In the present embodiment, the rolling elements 15, 16 are designed as balls. Alternatively, the rolling elements 15, 16 can be tapered elements (see FIG. 10), cylindrical elements (see FIG. 11) or barrelled elements (see FIG. 12).

In the radial direction, the rolling elements 15, 16 are each surrounded on the outside by outer races 3, 4. In the embodiment shown, the second outer race 4 is designed somewhat thinner than the first outer race 3. A filling 5 made from an amorphous/solid active medium is arranged in the available space as a mechanism for compensation of axial loads. The outer races 3, 4 and the filling 5 are closed off from the outside by a casing 20. In the axial direction, the bearing device 10 is connected to the casing by a counter bearing 25, for example a snap ring. This is important for example in the case of load reversal in an aircraft engine.

A medium comprising solid particles is referred to as being amorphous/solid, where the particles have a defined or undefined particle size. Examples for an amorphous/solid medium are sand or a ball filling.

In the present example, a filling 5 of steel balls with substantially identical diameter is used. Generally speaking, fillings 5 with particles, in particular balls with mean diameters between 0.2 and 15 mm, are suitable. In particular, particles with mean diameters between 3 and 7 mm, very particularly 5 mm, can be used.

In alternative embodiments, the particles can have other shapes and size distributions.

An amorphous/solid filling 5 behaves in many respects like a liquid. For example, the amorphous/solid filling 5 yields under pressure. However, due to the particle size it is not necessary to provide a seal, as would be the case with pneumatic or hydraulic active mediums.

The amorphous/solid active medium of the filling 5 is acted upon by piston surfaces A1, A2 of defined size. In the radial direction, the filling 5 is permanently enclosed between the casing 5 and the second outer race 4, so that only movements in the axial direction are possible.

The first bearing 1 has for that purpose first piston surfaces A1 on the circumference of the first outer race 3. They are designed vertically to the longitudinal axis of the bearing device 10 and thus form a vertical pressure surface onto the filling 5. The first piston surfaces A1 are here spaced from one another on the circumference, so that there is an interspace between the first piston surfaces A1.

Second piston surfaces A2 are arranged in this interspace and connected to the second outer race 4 of the second bearing 2.

In the embodiment shown, the first and second piston surfaces have identical sizes. In alternative embodiments, the piston surfaces can however have differing sizes.

In known two-row bearing devices, even minor constructional divergences (for example in the micrometer range) and/or temperature gradients lead to an unequal distribution of the axial loads in the bearing device. If for example the inner race is 10° C. warmer than the outer race, this can for example lead to a mismatch of 5 µm, which in turns leads to unbalanced forces in the bearing device.

With the embodiment shown in FIG. 1, these unbalanced forces can be reduced or prevented regardless of the operating conditions.

If the first bearing 1 is now subjected to a heavier axial load due to an uneven distribution of the loads on the bearing device, the first piston surfaces A1 press in the direction of the second bearing 2, i.e. into the filling 5. The filling 5 absorbs the applied pressure, which leads to the filling 5 pressing onto the second piston surfaces A2 of the second bearing. Hence the pressure from the first bearing 1 onto the filling 5 triggers a counter pressure via the second piston surfaces A2 back onto the first bearing 1. As a result, an axial imbalance between the bearings 1, 2 is compensated; each of the bearings 1, 2 bears half of the axial load. A compensation of the forces in the reverse direction, from the second bearing 2 to the first bearing 1, would of course also work.

In the embodiment shown, the piston surfaces A1 A2 have the same size, such that the pressure onto the filling 5 is identical to the resetting pressure onto the outer race 3, 4. If the piston surfaces A1. A2 are of differing sizes, the force can be reinforced in the manner of a hydraulic press.

Figure 8:
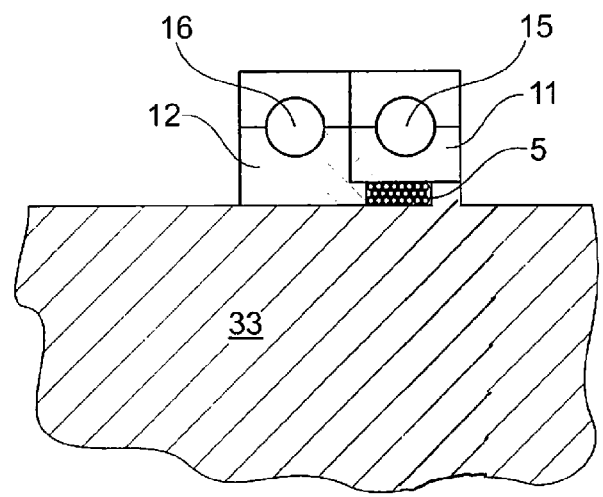
FIG. 8 shows a partial schematic view of an embodiment where an inner race interacts with a shaft.

Generally speaking, it is possible for the bearing arrangement also to have more than two bearings 1, 2. The transmission of forces would be achieved similarly to that in the above description. Should it be necessary, a bearing 1, 2 too far away from the filling 5 could be brought into contact with the filling using compression members, spacer sleeves or similar (see FIG. 4). Alternatively or additionally, the bearing race can be the inner race and the surrounding component a part of a shaft connected to the inner race. The filling is arranged and securely held between the bearing race and the surrounding component. See FIG. 8.

Figure 2:
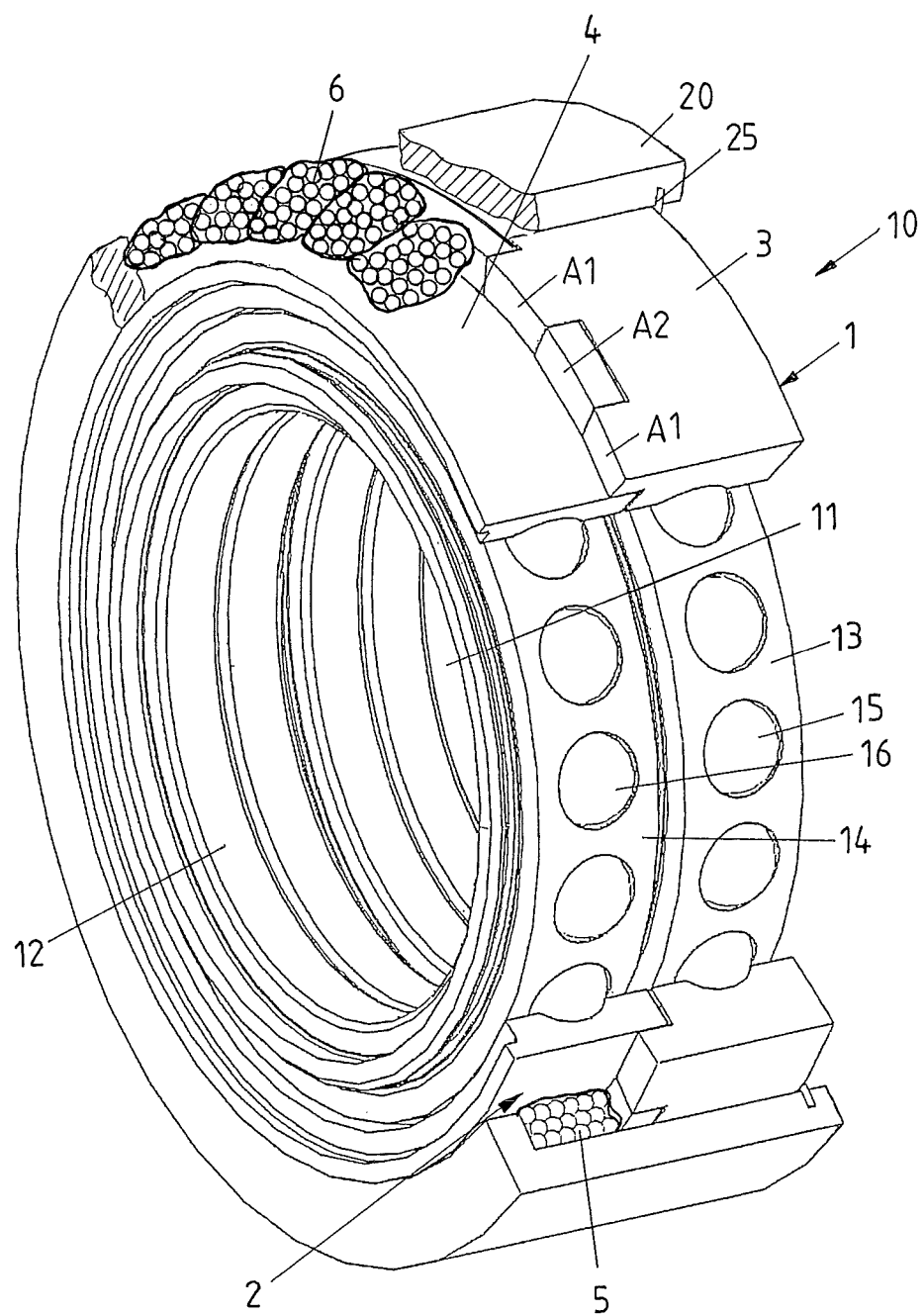
FIG. 2 shows an embodiment with a partly packed filling.

FIG. 2 shows an embodiment in which the filling 5 again is a ball filling, where the balls have substantially the same diameter. Unlike the filling shown in FIG. 1, the filling here is divided into individual packs, i.e. there are filling packs 6 in which the balls are sealed inside plastic films. The plastic films are so flexible that the pressure-compensating effect of the filling 5 is not impaired. Loading of the bearing device 10 is facilitated by the use of the sealed particles of the filling 10. In alternative embodiments, only an annular filling pack 6 is used, or several filling packs 6 of differing size are used. It is also possible to use other materials as the enclosing material. The packed filling 5 should however in turn fill the entire pressure chamber. Alternatively or additionally, the particles of the filling 5 can also be embedded in a flexible plastic compound.

Figure 3:
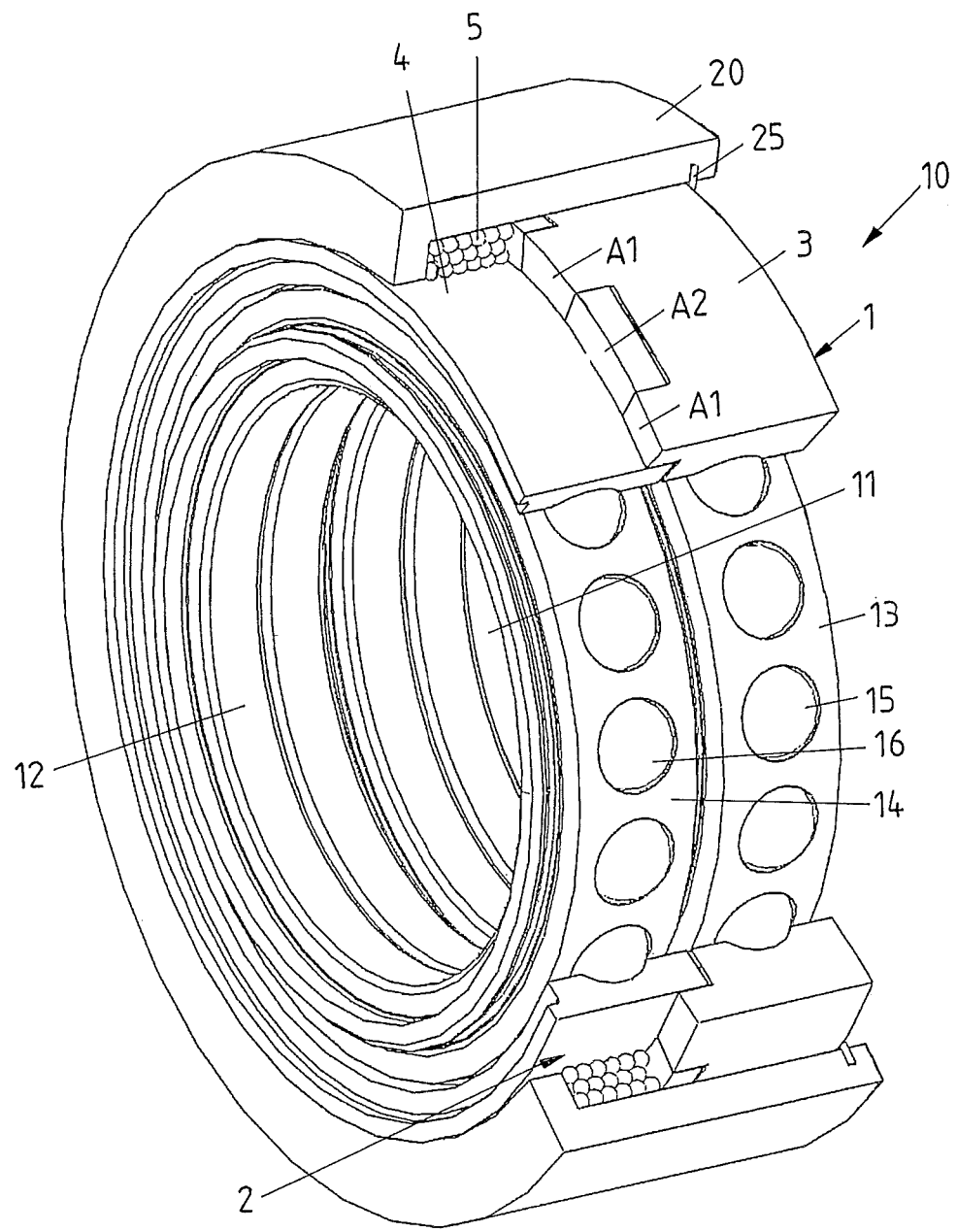
FIG. 3 shows an embodiment of a bearing device where pressure transmission is accomplished via piston surfaces of different size.

FIG. 3 shows a variant of the embodiment already described in FIG. 1 so that reference can be made to the respective description.

Unlike in the embodiment according to FIG. 1, a bearing device 10 is shown in FIG. 3 in which the pressure/piston surfaces A1, A2 are of differing sizes. The second piston surface A2 is larger than the piston surface A1. This allows force reinforcements or also an adjustment of displacement paths, similarly to a hydraulic press, to be achieved. In an alternative embodiment, the piston surfaces A1 of the first bearing 1 are larger than those of the second bearing 2. In similar manner, pressure-transmitting elements 17 of differing size can also be used.

Figure 4:
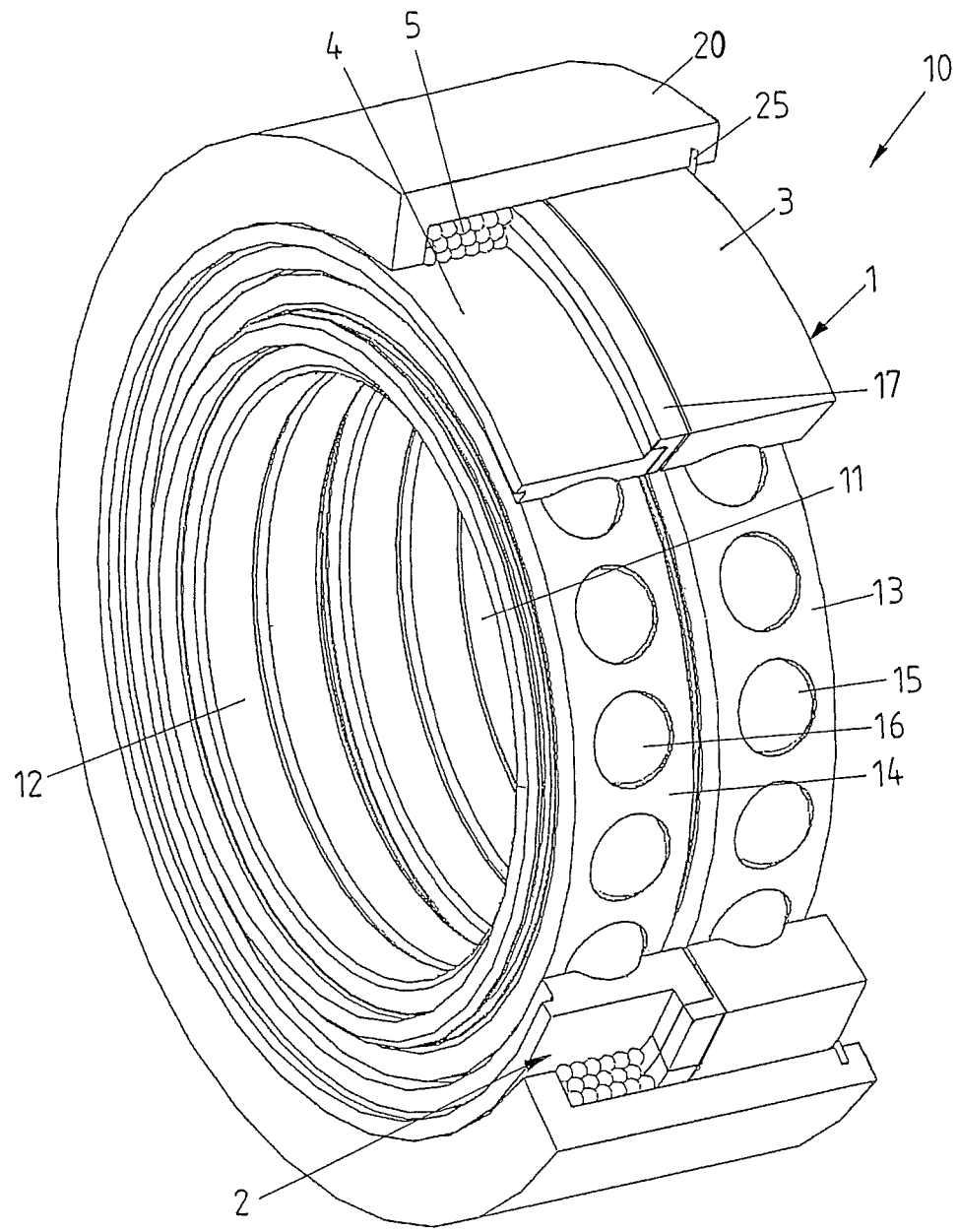
FIG. 4 shows a first embodiment with a pressure-transmitting element.

FIG. 4 shows a further variant of the embodiment according to FIG. 1, so that reference can be made to the respective description. The force is however here transmitted to the filling 5 via a pressure-transmitting element 17, a type of annular adapter. Thus the first bearing 1 can still transmit a force to the filling 5 if for design reasons the latter has to be arranged further to the left (in FIG. 4) in the axis direction. By the use of pressure-transmitting elements 17, degrees of design freedom are obtained since the filling 5 does not necessarily have to be arranged above the bearing race, in this case the outer race 4.

It is thus for example possible for the ball filling to be positioned outside the actual bearing, i.e. axially offset to the outer races 3, 4. In FIG. 4 this would mean that the ball filling 5 is arranged further to the left, inside a container, where the force is transmitted not via the outer race 3, but instead for example using spacer sleeves, compression members or the like in order to transmit the axial load onto the filling 5. An embodiment of this type is shown in connection with FIG. 5.

Figure 5:
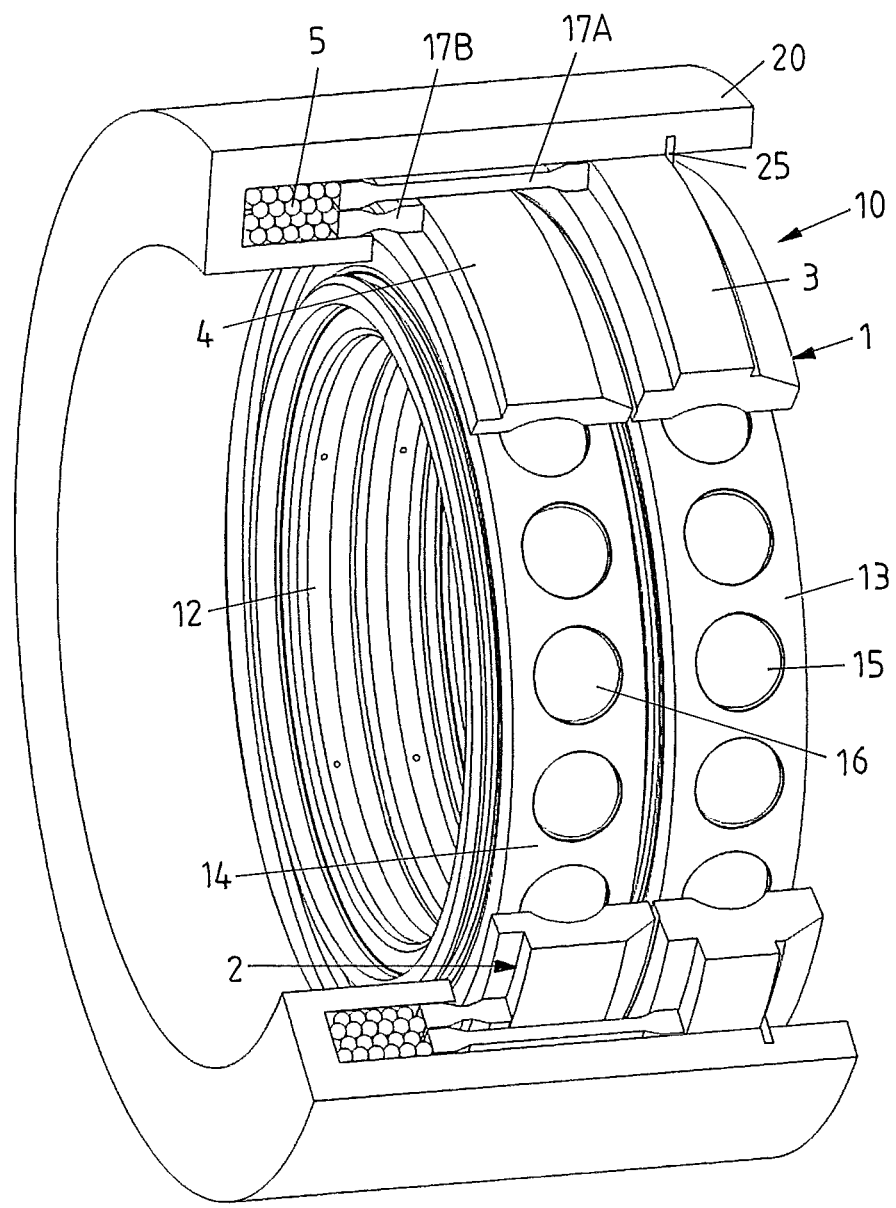
FIG. 5 shows a second embodiment with a pressure-transmitting element.

FIG. 5 shows a second variant of the embodiment according to FIG. 1, so that reference can be made to the respective description. The transmission of force onto the filling 5 is however achieved here via two pressure-transmitting elements 17A, 17B, a type of annular adapters which can also be considered as sleeve-like. Hence forces can be transmitted between the bearings 1, 2 via the filling 5 which is arranged in the axial direction next to the bearings 1, 2.

Both pressure-transmitting elements 17A, 17B are here arranged concentrically. The first pressure-transmitting element 17A has a larger radius and a larger width in the axial direction than the second pressure-transmitting element 17B. The first pressure-transmitting element 17A acts axially on the outer race 3 of the first bearing 1, and the second pressure-transmitting element 17B acts axially on the outer race 4 of the second bearing 2.

Both pressure-transmitting elements 17A, 17B are in contact with the filling 5 on the side facing away from the outer races 3, 4. When a pressure-transmitting element 17A is pressed in the axial direction into the filling 5, the amorphous/solid particles, in this case balls, as the active medium of the filling evade the pressure and force the other pressure-transmitting element 17B axially into the other direction.

Figure 6:
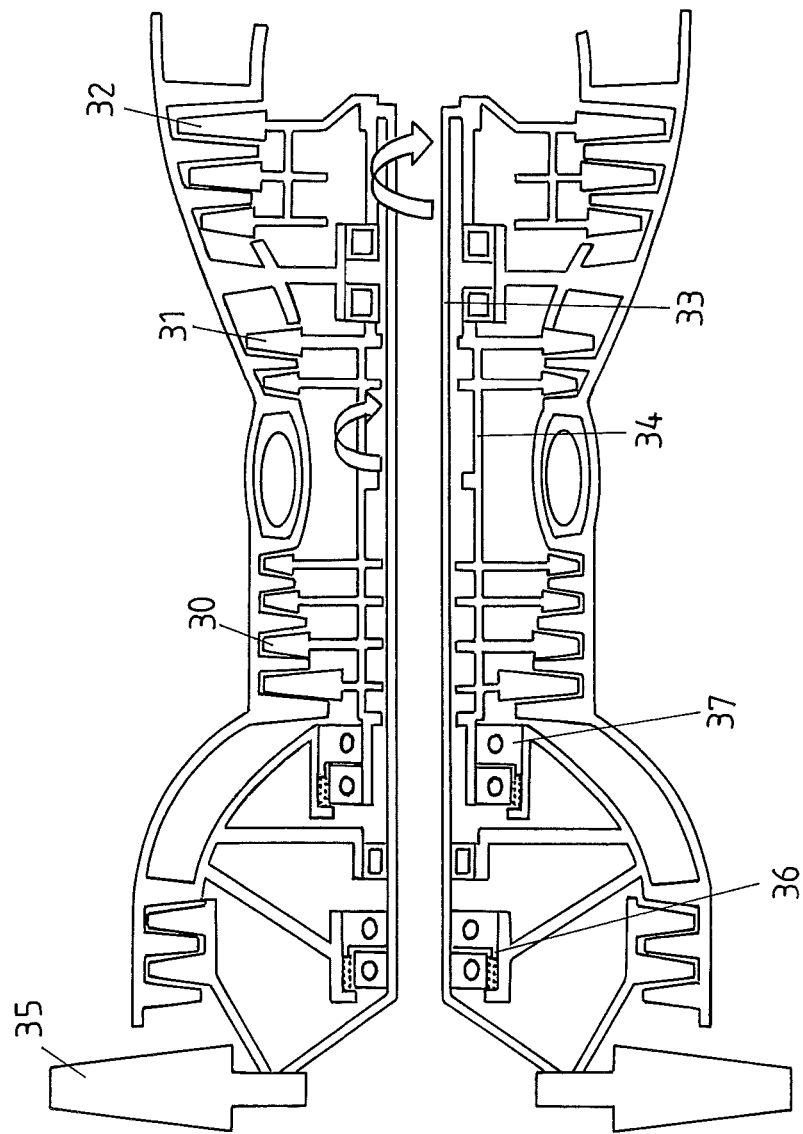
FIG. 6 shows a representation of an aircraft engine with one embodiment of a bearing device.

In FIG. 6 a sectional view of an aircraft engine known per se is represented. Here, the aircraft engine has two shafts 33, 34. A high-pressure compressor 30, a high-pressure turbine 31 and a low-pressure turbine 32 are arranged downstream of a fan 35 in flow direction.

Possible installation locations for embodiments of the bearing devices are for example the front bearing 36 of the low-pressure shaft 34 and/or the front bearing 37 of the high-pressure shaft 33. The fillings 5 of the respective bearings are only shown schematically for reasons of clarity.

LIST OF REFERENCE NUMERALS

1 First bearing
2 Second bearing
3 Outer race of first bearing
4 Outer race of second bearing
5 Filling of amorphous/solid material
6 Filling packs
10 Bearing device
11 First inner race
12 Second inner race
13 Cage for rolling elements of first bearing
14 Cage for rolling elements of second bearing
15 Rolling elements of first bearing
16 Rolling elements of second bearing
17 Pressure-transmitting element
20 Casing
25 Counter bearing
30 High-pressure compressor
31 High-pressure turbine
32 Low-pressure turbine
33 High-pressure shaft
34 Low-pressure shaft
35 Fan
36 Front bearing of the low-pressure shaft
37 Front bearing of the high-pressure shaft
A1 Pressure/Piston surface of first bearing
A2 Pressure/Piston surface of second bearing

The invention claimed is:

1. A bearing device comprising:
   an arrangement of at least two bearings, each having a bearing race;
   a filling comprising an active medium of an amorphous-solid substantially made up of a plurality of solid particles, the filling operatively arranged to transfer force between the bearing race of one of the bearings and the bearing race of another of the bearings to compensate for axial loads between the at least two bearings.

2. The bearing device in accordance with claim 1, wherein the plurality of solid particles includes a plurality of balls.

3. The bearing device in accordance with claim 2, wherein the plurality of balls are a same size.

4. The bearing device in accordance with claim 1, wherein the bearing races, each have a defined pressure surface in operative connection with the filling for exerting an axial pressure force on the filling.

5. The bearing device in accordance with claim 4, wherein the bearing races are outer races.

6. The bearing device in accordance with claim 4, wherein the defined pressure surface of a first of the bearing races, and the defined pressure surface of a second of the bearing races, have different sizes.

7. The bearing device in accordance with claim 6, wherein the first and second of the bearing races are outer races.

8. The bearing device in accordance with claim 1, wherein at least a part of the plurality of solid particles is at least one chosen from contained within a flexible film and combined with a flexible plastic compound.

9. The bearing device in accordance with claim 1, and further comprising at least one pressure-transmitting element, arranged between at least one of the bearing races and the filling.

10. The bearing device in accordance with claim 9, wherein the at least one pressure-transmitting element is at least one chosen from a spacer sleeve, a ring and a compression member.

11. The bearing device in accordance with claim 9, wherein the pressure-transmitting element includes two sleeves concentric to one another, with one of the sleeves being arranged between one of the bearing races and the filling, and another of the sleeves being arranged between another of the bearing races and the filling.

12. The bearing device in accordance with claim 1, wherein at least one of the bearings is at least one chosen from an anti-friction bearing, an axial bearing and a plain bearing.

13. The bearing device in accordance with claim 1, wherein at least one of the bearings comprises rolling elements shaped as at least one chosen from spherical, barrelled, tapered and cylindrical.

14. The bearing device in accordance with claim 1, wherein at least one of the at least two bearings is a radial bearing and at least one of the at least two bearings is an axial bearing.

15. The bearing device in accordance with claim 1, wherein at least one of the bearing races is a split inner race.

16. The bearing device in accordance with claim 1, wherein the bearing race of the one of the bearings and the bearing race of the other of the bearings are positioned adjacent one another, with the bearing race of the one of the bearings including a plurality of first projecting piston portions spaced apart from one another around a first circumference of the bearing race of the one of the bearings; the bearing race of the other of the bearings including a plurality of second projecting piston portions spaced apart from one another around a second circumference of the bearing race of the other of the bearings; the first projecting piston portions interleaved with the second projecting piston portions around the first and second circumferences; the filling being operatively arranged to transfer force between the first projecting piston portions and the second projecting piston portions.

17. The bearing device in accordance with claim 1, wherein the bearing race of the one of the bearings and the bearing race of the other of the bearings are positioned adjacent one another, with the bearing race of the one of the bearings including a first projecting piston portion positioned around a first circumference of the bearing race of the one of the bearings; the bearing race of the other of the bearings including a second projecting piston portion positioned around a second circumference of the bearing race of the other of the bearings; the first projecting piston portion and the second projecting piston portion being concentric with one another and overlapping one another in a radial direction of the bearing device; the filling being operatively arranged to transfer force between the first projecting piston portion and the second projecting piston portion.

18. A turbomachine, comprising at least one bearing device in accordance with claim 1.

19. The turbomachine in accordance with claim 18, wherein the turbomachine is an aircraft engine having a two shaft configuration; wherein the at least one bearing device is arranged between a low-pressure shaft and a high-pressure shaft.

20. A bearing device comprising:
an arrangement of at least two bearings, each having an inner race and an outer race;
a filling comprising an active medium of an amorphous-solid substantially made up of a plurality of solid particles, the filling operatively arranged to transfer force between an outer race of one of the at least two bearings, an outer race of another of the at least two bearings and a casing connected to at least one of the outer races to compensate for axial loads between the at least two bearings.

21. A bearing device comprising:
an arrangement of at least two bearings, each having an inner race and an outer race;
a filling comprising an active medium of an amorphous-solid substantially made up of a plurality of solid particles, the filling operatively arranged to transfer force between an inner race of at least one of the at least two bearings and a shaft connected to the inner race to compensate for axial loads between the at least two bearings.

* * * * *